US00RE35923E

United States Patent [19]

Mitsuya

[11] E Patent Number: Re. 35,923

[45] Reissued Date of Patent: Oct. 13, 1998

[54] FIXING DEVICE, FIXING METHOD, AND RECORDING APPARATUS

[75] Inventor: Teruaki Mitsuya, Ibaraki-ken, Japan

[73] Assignees: Hitachi, Ltd.; Hitachi Koki Company, Ltd., both of Tokyo, Japan

[21] Appl. No.: 693,844

[22] Filed: Jul. 23, 1996

Related U.S. Patent Documents

Reissue of:

[64] Patent No.: 5,485,260
Issued: Jan. 16, 1996
Appl. No.: 350,069
Filed: Nov. 29, 1994

[30] Foreign Application Priority Data

Dec. 1, 1993 [JP] Japan ..... 5-301752

[51] Int. Cl.[6] ..... G03G 15/20

[52] U.S. Cl. ..... 399/330; 399/67; 399/69; 399/328

[58] Field of Search ..... 399/33, 67, 69, 399/68, 320, 328, 330, 372, 397, 322, 323, 331; 219/216

[56] References Cited

U.S. PATENT DOCUMENTS

| | | | |
|---|---|---|---|
| 4,585,325 | 4/1986 | Euler | 399/69 |
| 4,937,631 | 6/1990 | Kim et al. | 399/322 |
| 5,119,142 | 6/1992 | Swapceinski et al. | 399/331 |
| 5,153,656 | 10/1992 | Johnson et al. | 219/216 X |
| 5,187,527 | 2/1993 | Forlani et al. | 399/406 |
| 5,241,159 | 8/1993 | Chatteriee et al. | 219/216 |
| 5,241,354 | 8/1993 | Flynn | 399/323 |
| 5,325,164 | 6/1994 | Tai et al. | 399/322 |
| 5,345,300 | 9/1994 | Uehara et al. | 219/216 X |

FOREIGN PATENT DOCUMENTS

| | | |
|---|---|---|
| 29 28 935 B2 | 1/1977 | Germany . |
| 2717260 | 10/1978 | Germany . |
| 30 25 104 A1 | 1/1982 | Germany . |
| 33 09 398 A1 | 9/1984 | Germany . |
| 27 17 260 C3 | 7/1986 | Germany . |
| 37 34 673 A1 | 4/1988 | Germany . |
| 42 18 664 A1 | 12/1992 | Germany . |
| 64-9483 | 1/1989 | Japan . |
| 4-280280 | 10/1992 | Japan . |
| 5-504634 | 7/1993 | Japan . |

*Primary Examiner*—Sandra L. Brase
*Attorney, Agent, or Firm*—Antonelli, Terry, Stout & Kraus, LLP

[57] ABSTRACT

A fixing device for fixing the toner on the recording medium comprising a pair of fixing rollers which face each other and rotate in opposite direction to form a nipping and fusing section for toner fixing, with at least one of the rollers internally provided with a heating element, and a recording medium guiding device for changing the length of contact area of the recording medium to the fixing roller with heating element in accordance with the recording medium thickness, which is provided at the downstream side extending from the nipping and fusing section. This allows the device to be reduced in size and the fixing strength to be increased independent of the recording medium thickness.

27 Claims, 6 Drawing Sheets

FIXING DEVICE, FIXING METHOD, AND RECORDING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a recording apparatus based on electrophotographic method for a printer, copying machine, facsimile, or the like, and, more particularly, to a fixing device and fixing method excellent for fixing a toner image onto a recording medium, and a recording apparatus.

2. Description of the Related Art

A conventional recording apparatus based on electrophotographic method is involved in a process for making visible a toner image on a recording medium, and in a process for fixing the resulting toner image onto the recording medium. The heated toner image is fused onto the recording medium, and then cooled and solidified. In the fixing process, utilizing the properties of the toner, it is heated and fused, and then naturally cooled so that it is fix onto the recording medium.

In a conventional fixing device, in the fixing process, a pair of fixing rollers, made up of one roller and one supporting roller, is press-contacted. At least one of the fixing rollers is heated to bring the pair of fixing rollers into contact with each other, thereby forming a nipping and fusing section. The recording medium is passed through this nipping and fusing section to fix the toner aligned thereon. When the recording medium is passed through the nipping and fusing section, the aligned toner which forms an image on the recording medium is heated and at the same time subjected to pressure. The heat energy and pressure applied at the nipping and fusing section changes the shape of the toner. This action causes the toner to be fixed onto the recording medium. Here, only one of the fixing rollers needs to be heated. The toner image formed on the recording medium passes through the nipping and fusing section so that its toner-image bearing surface and the heated fixing roller contact each other. The heated heat fixing roller is called the heat roller, while the supporting roller is called the back-up roller. The heat roller and the back-up roller together may be called a pair of fixing rollers. In addition, either of the heat roller or the back-up roller may be called a fixing roller.

The heat roller is a hollow cylinder made of aluminum and has a heater at its central section. The aluminum hollow cylinder is called a core metal. A halogen lamp is often used for the heater. When this fixing device is used to heat the toner image, offsetting may occur in which the fused toner gets stuck onto the heat roller. When fixing is carried out for the second time, offsetting causes the toner to be transferred from the heat roller onto the recording medium, which results in misprinting. To prevent this, a material having high releasing capability such as silicone, rubber, fluorocarbon rubber, or fluorocarbon resin is used to form a parting layer, which is the surface layer of the heat roller which contacts the toner. In general, fluorine, silicone rubber, or fluorocarbon rubber is used for the surface layer. In particular, fluorocarbon resin is widely known for its high releasing capability. Examples of fluorocarbon resin surface layer materials which are frequently used include perfluoroalkoxy copolymer (PFA) and polytetrafluoroethylene (PTFE). The parting layer, which has a lower thermal conductivity than the core metal, acts as a thermal resistance section during fixing.

On the other hand, the back-up roller or the supporting roller has an elastic layer formed along the outer periphery of its metallic rotating body. When it is press-contacted with the heat roller, the elastic layer changes shape to form a nipping and fusing section.

Fan fold paper is primarily used for the recording paper. In the longitudinal dimension, it has perforations spaced apart at certain intervals. This type of recording medium is also called continuous paper.

In a conventional method of fixing a toner image by transporting continuous paper at a high Speed, the pair of fixing rollers do not provide enough heat for the toner. Therefore, a preheater or other such means is placed at a location just before the recording medium passes through the pair of fixing rollers. This preheater is often a hot plate which is positioned in the transporting path. It performs preheating from the back surface of the toner-image bearing surface of the continuous paper, which makes it necessary to supply heat corresponding to the thickness of the recording medium. This is not thermally efficient. The preheater, itself, must be made larger for sufficient and effective preheating, with the result that more space must be provided for the preheater than for the pair of fixing rollers. Such a prior art described above is disclosed, for example, in Japanese Patent Laid-Open No. Sho 64-9483 and Japanese Patent Laid-Open No. Hei 25-504634.

Merely removing the preheater does not solve the above-described problem present in the conventional fixing device. This is because it is difficult to provide the necessary heat for fixing the toner image by only using a pair of fixing rollers alone. When the parting layer of the beat roller is reduced in thickness, its thermal resistance decreases. As the amount of heat applied to such a thin parting layer increases, the wearing resistance of the heat roller is considerably reduced. This in turn reduces the heat roller life, so that the fixing device cannot be used for practical purposes. In preheating the recording medium which is brought into contact with the heater before it reaches the nipping and fusing section or forwardly of the heat roller, the toner is only accumulated on the recording medium and is not adhered thereon. In addition, the recording medium, which is not nipped by the back-up roller, undergoes thermal contraction. This causes a slippage between the recording medium and the heat roller surface, giving rise to image slippage.

To solve the above-described problems, a method may be used to allow the recording medium to remain in contact with the heat roller even after it has passed through the nipping and fusing section. Since the toner image is heated while it is nipped between the rollers, it is adhered onto the recording medium without the occurrence of image slippage. The condition of the toner image immediately after it has been nipped is not satisfactory from the viewpoint of fixing because there is not enough adhesion force. However, even if, a slippage occurs between the recording medium and the heat roller surface due to thermal contraction of the medium, image slippage will not occur since there is some adhesion force between the toner and the recording medium. Since thermal contraction of the recording medium is considerable immediately after heating, a substantial amount of thermal contraction force is developed in the nipping and fusing section. However, the medium is nipped by the back-up roller, so that thermal contraction, itself, does not occur. Thermal contraction of the recording medium is slight in the contact region after it has passed through the nipping and fusing section. When this method is taken, the following technical problems need to be overcome.

(1) For a thick recording medium, the same conventional method is used to increase the amount of heat provided by the heat roller, which is required for overcoming fixing failure. When the thick medium is subjected to the same heating conditions as a thin one, the toner is fixed less strongly onto the recording medium. Therefore, one technical problem which needs to be solved is how to increase the fixing strength of the toner onto the recording medium irrespective of the medium thickness.

(2) The same conventional method is used to provide more heat to the central portion of the heat roller as compared to the end portions of the heat roller extending beyond the width span of the: recording medium. The difference between the amount of heat supplied to the central portion and that supplied to the ends gradually increases, so that when printing is performed successively for a long period of time, the temperature of the central portion of the heat roller drops significantly. This results in a marked temperature difference distribution in the longitudinal direction of the heat roller. For this reason, a fixing failure occurs, in particular, at the central portion of the heat roller, in which the toner is less strongly fixed onto the recording medium. Consequently, in carrying out printing successively for a long period of time, another technical problem is how to control temperature drop of the central portion of the heat roller to prevent fixing failure thereof.

(3) After thermal energy and pressure have been applied to the recording medium and toner at the nipping and fusing section, heat energy is supplied from the contact region thereto. For this reason, more work is done by thermal energy required for fixing by proportion than by pressure. As a result, after fixing, more time is required for the temperature drop of the recording medium, which slows down the solidification of the toner. Because of this, the toner remains fused even in a paper stacker which stacks recorded paper, so that when the recording medium is folded a phenomenon called toner stick occurs in which the toner adheres onto other portions of the recording medium surface not requiring fixing, and other toner images. When toner stick occurs, the necessary information is transferred onto other recording medium surfaces, so that after recording unnecessary information may be recorded or necessary information may be missing to give rise to image loss. Another technical problem is how to prevent misprinting and image loss due to toner stick.

SUMMARY OF THE INVENTION

An object of the present invention is to provide a fixing device having a small-sized heat roller having a long life, and which prevents image slippage from occurring, which is made possible by removing the preheater.

Another object of the present invention is to allow the toner to be fixed with sufficient strength onto the recording medium regardless of the medium's thickness.

Still another object of the present invention is to allow the temperature drop of the central portion of the heat roller in the fixing device to the controlled when printing is performed successively for a long period of time to prevent fixing failure thereof.

A further object of the present invention is to prevent misprinting and image loss caused by toner stick from occurring.

To these ends, there is provided according to one aspect of the invention a fixing device in which a recording medium to be transported is nipped to fix the toner image formed thereon. The device comprises a pair of rotatable rollers which face each other, with at least one of the rollers internally provided with a heating element, the pair of fixing rollers press-contacting the recording medium to form a nipping and fusing section for fixing the toner image. It also comprises a recording medium guiding means for changing the length of the contact area of the recording medium to the outer periphery of the fixing roller with heating element in accordance with the recording medium thickness, which is provided at the downstream side from the nipping and fusing section formed by the fixing rollers. The recording medium guiding means is made up of a recording medium guiding roller and a rotatable supporting arm and the rotating angle of its supporting arm can be set to a predetermined value in accordance with the recording medium thickness. In addition, a control means may be provided for automatically setting the rotating angle of the supporting arm in accordance with the recording medium thickness.

The fixing roller with heating element is an aluminum hollow cylinder, which is called a core metal, whose outer periphery is coated with a parting layer of fluorocarbon resin material, with a halogen lamp used for the heating element.

The fixing roller with hearing element may have at least one heat pipe as heating element embedded in the interior of the cylindrical core metal in the longitudinal dimension.

The fixing roller with heating element may have in its interior a plurality of heating elements each having a different heating value along its longitudinal dimension and detectors for detecting the surface temperature of the roller, which are provided so as to face the roller at positions corresponding to those sections of the heating elements where the heat value of each heating element is maximum, so as to control the operation of the heating elements and thereby to maintain the roller surface temperature at a predetermined value.

A circuitous guiding member may be provided along with the recording medium guiding means at the downstream side of the transporting direction of the recording medium between the recording medium guiding means and a recording medium stacker for allowing cooling of the recorded medium.

The fixing roller with heating element may be a copper hollow cylinder or core metal whose outer surface is plated with nickel, the resulting outer periphery of the nickel plated surface further coated with a parting layer of fluorocarbon resin material.

Any of the aforementioned fixing device is built in the recording apparatus as at least one component.

To these aforementioned ends, there is provided according to another aspect of the invention a fixing method in which a recording medium to be transported is nipped for fixing the toner image adhered thereon. The fixing method comprises the steps of fusing the toner by press-contacting the recording medium between a pair of rotatable rollers facing each other with at least one of its rollers internally provided with a heating element; and changing the length of the contact region of the recording medium to the outer periphery of the fixing roller with heating element in accordance with the recording medium thickness by means of a recording medium guiding means provided at the downstream side following the nipping and fusing section formed by the fixing rollers.

The fixing method may comprise the step of allowing cooling of the recorded medium by providing a circuitous guiding member between the recording medium guiding means and a recording medium stacker into which is discharged recorded medium.

According to the present invention, more heat is applied to the toner by allowing the recording medium to remain in contact with the contact region even after it has passed through the nipping and fusing section.

Sufficient fixing strength of the toner may be provided when a thick recording medium is used. This is made possible by increasing the contact region of the recording medium to the heat roller after it has passed through the nipping and fusing section, whereby the proper amount of heat is supplied to obtain the right fixing strength.

Increasing the thermal conductivity of the core metal of the heat roller accelerates thermal dispersion in the longitudinal dimension of the heat roller. This makes uniform the temperature distribution of the heat roller in the longitudinal dimension, so that when printing is performed successively for a long period of time, temperature drop at the central portion of the heat roller is controlled. This prevents fixing failure from occurring at the central portion of the heat roller. In addition, the heater supplies more heat to the central portion, that is where more heat is consumed, in accordance with the temperature distribution of the heat roller. This balances the amount of heat consumed and supplied, which makes uniform the temperature distribution of the heat roller in the longitudinal dimension. This also prevents fixing failure from occurring at the central portion of the heat roller.

Purposely increasing the length of time the recording medium needs to reach the stacker after it has passed through the nipping and fusing section and the contact region to the heat roller allows the recording medium to cool for that length of time. Therefore, the temperature of the recording medium in the stacker drops, so that toner stick will not occur. Consequently, misprinting and image loss are prevented.

The objects, advantages, and novel features of the present invention will be described in detail below with reference to the accompanying drawings.

DESCRIPTION OF THE PREFERRED EMBODIMENTS

Figure 1:
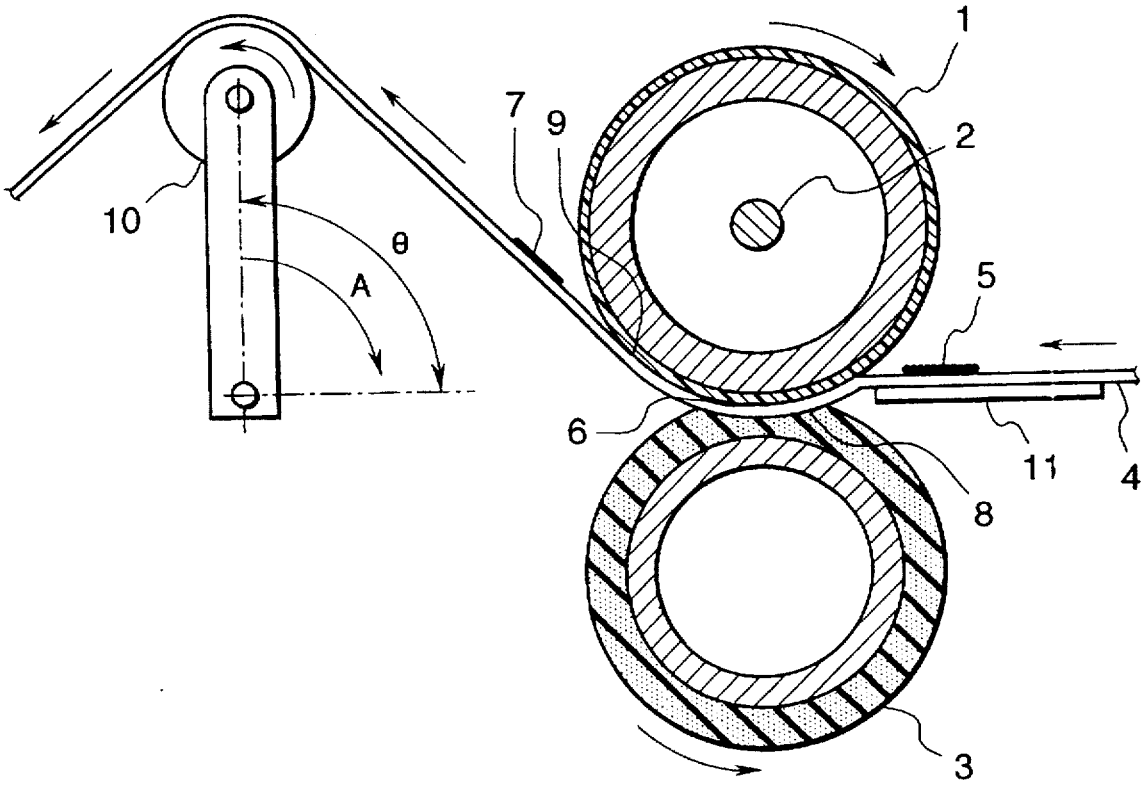
FIG. 1 is a longitudinal sectional view of one embodiment of the present invention.

An embodiment of the present invention will be described with reference to FIG. 1. FIG. 1 illustrates a fixing device in which a pair of fixing rollers 1 and 3 are press-contacted with each other, and in which at least one of the fixing rollers 1 is heated to form a nipping and fusing section 8. A recording medium 4 is passed through the nipping and fusing section 8 to fix an unfixed toner image 5 thereon. A contact area 9 extends from the nipping and fusing section 8. This is the region where the recording medium contacts the heated fixing roller (heat roller 1) after it has passed through the nipping and fusing section 8. A recording medium guiding means 10 is provided for changing the length of the contact area 9 according to the thickness of the recording medium 4. The recording medium 4 and the unfixed toner 5 aligned thereon are passed along a paper guide 11 through the nipping and fusing section 8, formed by press-contacting the back-up roller 3 and the heat roller 1, which has been heated by a heater 2. At the nipping and fusing section 8, after receiving thermal energy and being subjected to pressure, the unfixed toner 5 is compressed, fused, and deformed. At the exit of the nipping and fusing section 8, the unfixed toner 5 becomes a semi-fixed toner 6. When it is in a semi-fixed state, there is not enough fixing strength. Thereafter, however, an adhesion force is developed between the semi-fixed toner 6 and the recording medium 4, by an amount which does not cause image slippage at the contact area where the recording medium contacts the heat roller 1. That is, the recording medium 4 and the semi-fixed toner 6 formed on its surface are led by the recording medium guiding member 10 to the contact area 9, and further receive thermal energy from the heat roller 1 at the contact area 9, so that there is enough fixing strength. As a result, a fixed toner 7 having excellent fixing strength can be provided without the use of a preheater.

When fixing is experimentally performed with the recording medium guiding member 10 removed and without the contact area 9, unless transference of the toner onto the heat roller 1 from the recording medium 4 or offsetting occurs, the toner is in a semi-fixed state to an extent where toner image slippage does not occur. When offsetting occurs at the exit of the nipping and fusing section 8, not only does image slippage occur at the contact area 9. The offset toner, which does not return to the recording medium 4 side, also remains on the heat roller 1 surface, since pressure is not applied at the contact area 9. For this reason, it is important to prevent offsetting from occurring.

When a thick recording medium is used, it is necessary to increase the amount of heat supplied by the heat roller to prevent fixing failure. It is evident that performing the same heating as that for a thinner recording medium reduces to the fixing strength of the toner to the recording medium. This means that the fixing strength of the toner to the recording medium must be increased in accordance with the recording medium thickness. The recording medium guiding member 10 of the fixing device of the embodiment can be rotated clockwise in the direction of the arrow A as shown in FIG. 1. The set angle θ of the recording medium guiding member 10 is 90° when the recording medium 4 weighs 55 kg, 80° when it weighs 70 kg, 70° when it weighs 90 kg, 55° when it weighs 110 kg, and 450 when it weighs 135 kg. Here, the weight of the recording medium is per 1000 sheets of A1-sized recording medium. By inputting the paper thickness used for printing into the recording apparatus, the user can allow the recording medium guiding member 10 to automatically set θ to a predetermined angle. In addition, a detector for detecting the thickness of the recording medium 4 may be provided forwardly in the transporting direction of the recording medium 4 from the fixing device, so that the set angle θ is automatically controlled in accordance with the detected thickness. This operation provides the necessary and optimal amount of heat necessary for sufficient fixing strength to the semi-fixed toner 6. It is effective in consistently providing sufficient fixing strength in accordance with the recording medium 4 thickness.

Figure 2:
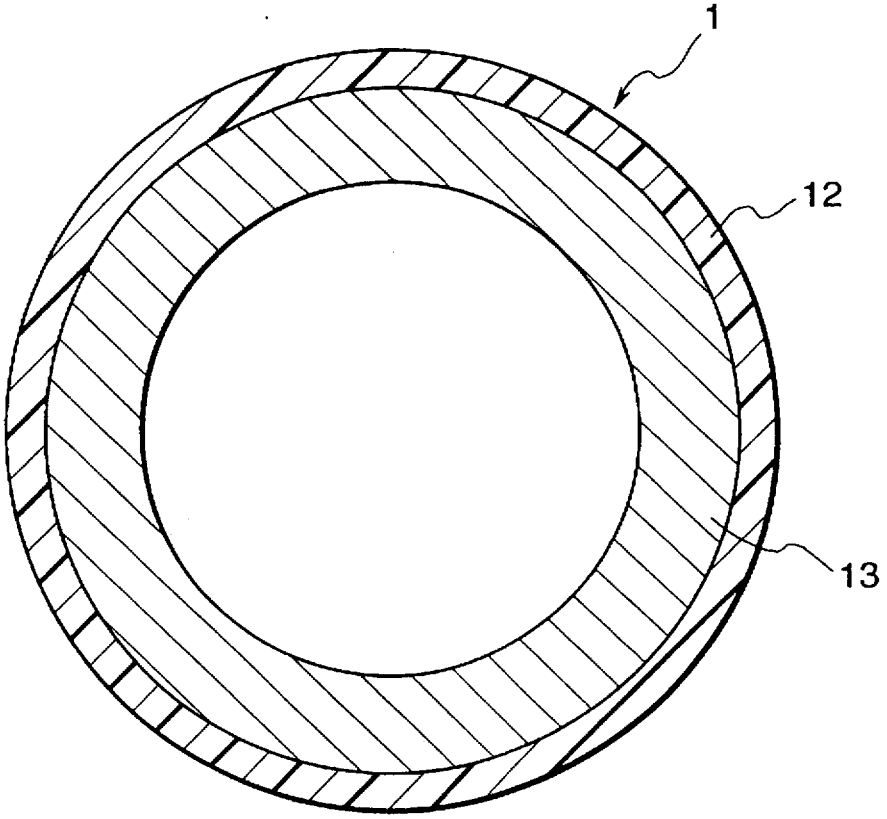
FIG. 2 is a cross sectional view of heat roller used in another embodiment of the present invention.

Another embodiment of the invention will be described with reference to FIG. 2. FIG. 2 is a cross sectional side view of the heat roller 1 used in the embodiment. Reference numerals 12 and 13 denote respectively a parting layer and a core metal. The other reference numerals denote the same things as those in the first embodiment the core metal 13 is a hollow cylinder made of copper. Its outer diameter is 90 mm, while its inner diameter is 75 mm. The longitudinal length as measured along a dimension perpendicular to the plane of the drawing is 500 mm. The parting layer 12 is made of PFA (fluorocarbon resin: perfluoroalkoxy copolymer), and is 60 μm in thickness. A halogen lamp is used for the heater 2, which shines on the core metal 13 and the parting layer 12 to heat them.

The central portion of the heat roller 1 experiences a larger temperature drop compared to both ends in the longitudinal direction which extend beyond the width span of the recording medium 4. Therefore, more heat is supplied to the central portion as in conventional fixing devices. However, when all of the heat necessary for fixing is supplied by the heat roller 1, more heat is supplied by the heat roller 1, so that the difference in the amount of heat supplied to the central portion as compared to the each end portion increases. When printing is carried out successively for a long period of time, there is a large temperature drop at the central portion of the heat roller 1. This develops a significant temperature difference distribution in the longitudinal direction of the heat roller. As a result, fixing failure may occur, in particular, at the central portion of the heat roller 1 in which the fixing strength of the fixed toner 7 to the recording medium 4 is reduced. Therefore, in the embodiment, in performing printing successively for a long period of time, temperature drop in the central portion of the heat roller 1 is controlled to prevent fixing failure thereof, in the following way. For the core metal 3, there is used copper which has about three times the thermal conductivity as compared to the conventionally used aluminum. This considerably improves the thermal diffusion of the heat roller 1 in the longitudinal direction. When printing is performed successively for a long period of time with the conventionally used aluminum core metal, there is a temperature difference of about 30° C. between the central portion and both ends of the heat roller 1. When it is carried out with copper, as in the embodiment, the temperature difference can be reduced to about 15° C. This prevents fixing failure or reduction of the fixing strength of the fixed toner 7 to the recording medium 4 of the central portion of the heat roller 1 from occurring. Copper which is used for the core metal 13 has poor adhesiveness to fluorocarbon resin PFA of which the parting layer 12 is made, so that the heat roller 1 cannot be used for a long time. To overcome this problem, in the embodiment, the heat roller 1 has the outer surface (not illustrated) of its copper core metal 13 plated with nickel which has excellent adhesiveness to PFA to form a PFA coating on the parting layer 12. According to the embodiment, there can be provided a fixing device which is capable of preventing fixing failure at the central portion of the heat roller 1, and which has a long life because it has good adhesiveness between the core metal 13 and the parting layer 12 of the heat roller 1.

Figure 3:
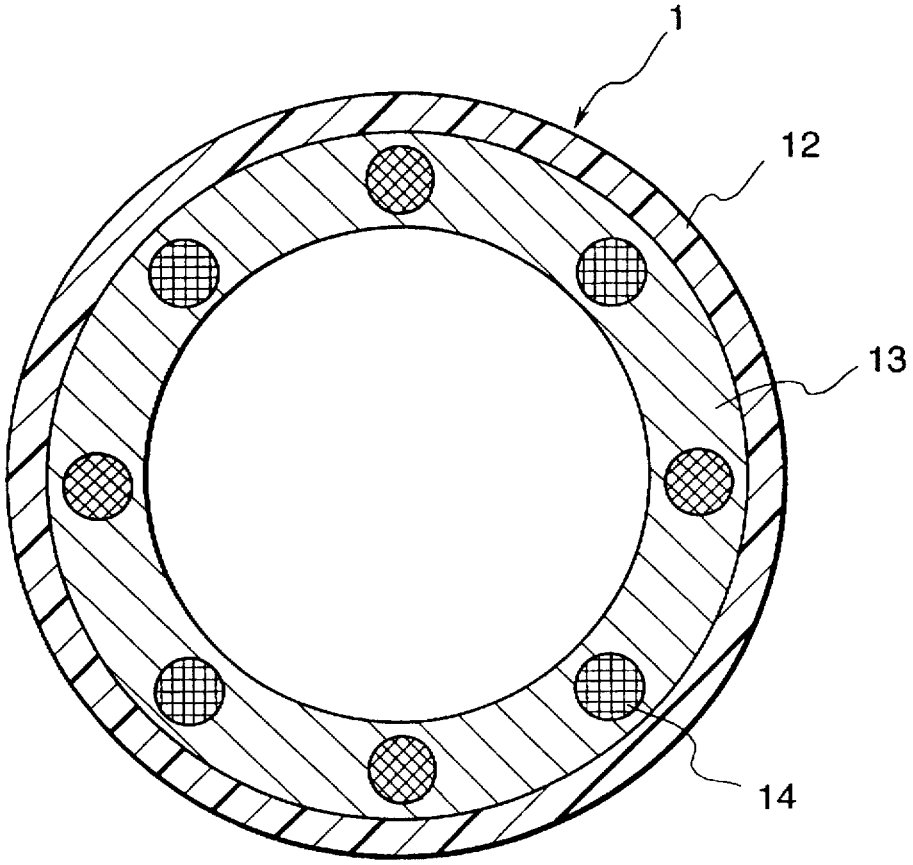
FIG. 3 is a cross sectional view of a heat roller used in another embodiment of the present invention.

Another embodiment of the present invention will be described with reference to FIG. 3. FIG. 3 is a cross sectional side view of the heat roller 1 used in the embodiment. Reference numeral 14 denotes a heat pipe. Other reference numerals denote the same things as those in FIG. 2. The dimensions of the heat roller 1 are the same as those of the second embodiment. However, the core metal 13 is made of aluminum and the outer surface is not plated with nickel. A plurality of heat pipes 14 are embedded in the core metal 13 for transferring heat from both ends to the central portion of the heat roller 1 in the longitudinal direction. The thermal conductivity of the core metal 13 is 5 times that of an aluminum core metal. In the embodiment, thermal diffusion in the longitudinal direction of the heat roller 1 is greatly improved by embedding heat pipes 14 which transfer heat from each end of the core metal 13 to the central portion. In carrying out printing successively for a long period of time, for the conventional aluminum core metal, the temperature difference between the central portion and the end portions of the heat roller 1 is approximately 30° C. With the embodiment, however, this can be reduced to less than 10° C. According to the embodiment, fixing failure of the central portion of the heat roller 1 in which fixing strength of the fixed toner 7 to the recording medium 4 is reduced, is made even less likely as compared to the second embodiment.

Another embodiment of the present invention will be described with reference to FIG. 4. As the second and third embodiments, this embodiment is aimed at preventing temperature drop of the central portion of the heat roller and reduced fixing strength of the fixed toner to the recording medium at the central portion of the heat roller when successively carrying out printing for a long period of time.

Figure 4:
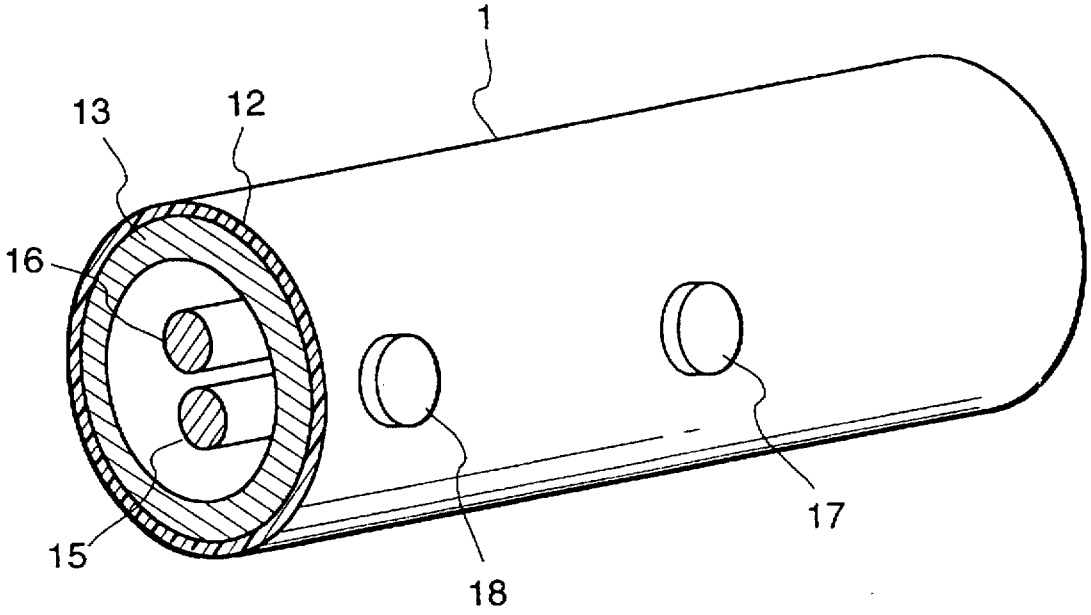
FIG. 4 is a perspective view of a heat roller used in another embodiment of the present invention.

FIG. 4 is a perspective view of the heat roller 1 used in the fourth embodiment of the present invention. Heater A 15 is a halogen lamp for increasing the heating value of the central portion of the heat roller, while heater B 16 is a halogen lamp for increasing the heating value of the end portions of the heat roller. The heating value distributions are both symmetrical with respect to the central line in the longitudinal direction. The heat roller 1 is formed symmetrically with respect to the central line, so that the recording medium can be transported while the central lines of the medium and the heat roller 1 are aligned, regardless of the size of the medium. Temperature sensor A 17 detects the temperature of the outer surface of the central portion of the heat roller 1, while temperature sensor B 18 detects the temperature of the outer surface of the end portions of the heat roller 1. The heater A 15 lamp is controlled such that it generates light when the temperature sensor A 17 has detected that the temperature is below a predetermined value. The heater B 16 lamp is controlled such that it generates light when the temperature sensor B 18 has detected that the temperature is below: a predetermined value. The set predetermined temperatures for both the temperature sensor A 17 and the temperature sensor B 18 are 180° C. and are thus equal. Although the control system is not just the heater A 15 is controlled based on the detected temperature of the temperature sensor A 17, while the heater B 16 is controlled based on the detected temperature of the temperature sensor B 18, so that the control systems are separately provided. The temperatures at two points where the sensor A 17 for the central portion of the heat roller 1 is set and where the temperature sensor B 18 for the end portions of the heat roller is set can be controlled at 180° C. The heater roller 1 allows the recording medium to be transported, while the central lines of the recording medium, which is symmetrically formed with respect to the central line, and that of the heat roller 1 are matched. The temperature of the other end located symmetrically to the temperature sensor B 18 can be controlled at 180° C., so that the temperature distribution of the heat roller 1 is made uniform. Supplying more heat to regions which consume a large amount of heat balances the amount of heat consumed and supplied, thereby making uniform the temperature distribution of the heat roller in the longitudinal direction. This controls temperature drop of the central portion of the heat roller even when printing is carried out successively for a long period of time, thereby preventing fixing failure of toner at the central portion of the heat roller. The effect of this embodiment has been described with reference to a symmetrical system along the longitudinal direction of the, heat roller. However, a non-symmetrical system may also be used. In the non-symmetrical system, heaters having a plurality of heat value distributions are used and temperature sensors are placed for each heater for detecting the temperature of the heat roller surface. Each of the heaters are controlled separately.: This allows the same effects as those of this embodiment to be realized.

Figure 5:
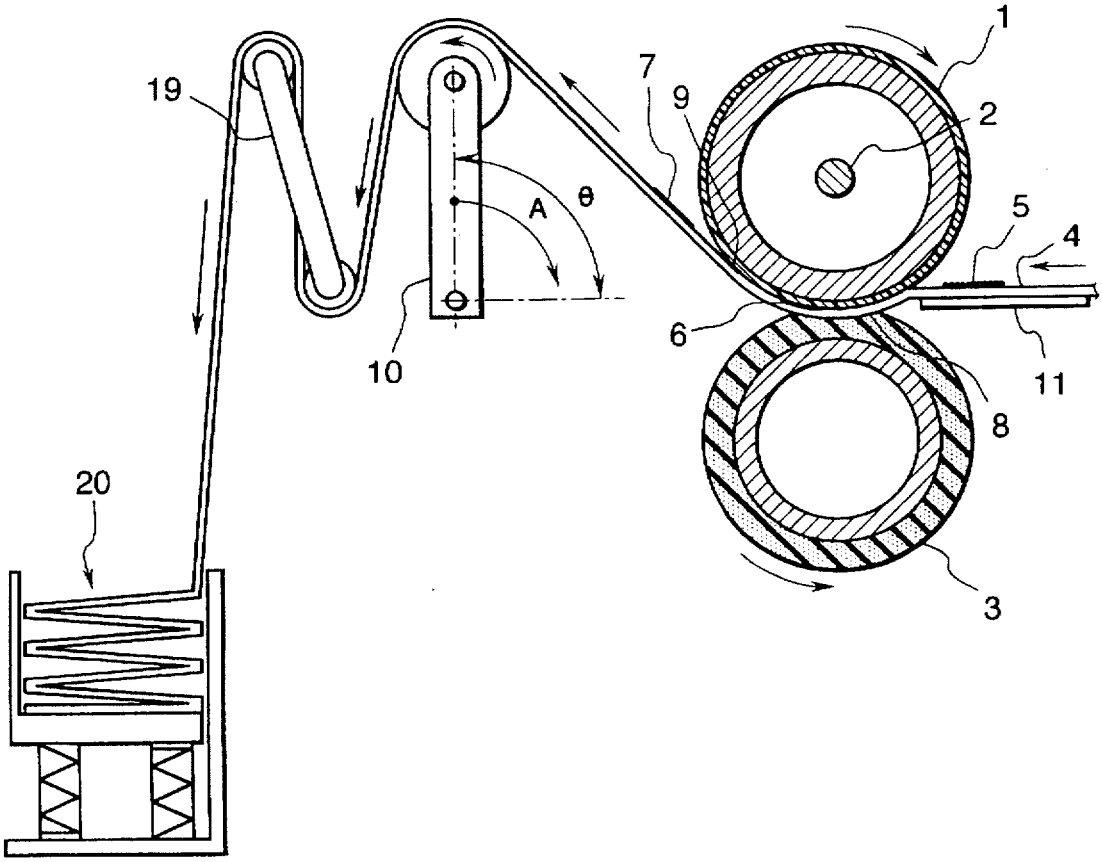
FIG. 5 is a longitudinal sectional view of another embodiment of the present invention.

Another embodiment of the present invention will be described with reference to FIG. 5. FIG. 5 is a cross sectional side view of the fixing device of the embodiment and the route taken by the recording medium after fixing. After passing the recording medium guiding member 10, the recording medium 4 is transported to a paper discharge stacker 20. In the stacker, the recording medium 4 is folded along its perforations and stacked thereat. After thermal energy and pressure have been applied at the nipping and fusion section 8 to the recording medium 4 and toner, heat energy is supplied at the contact area 9 thereto. For this reason, more work is done by thermal energy required for fixing by proportion than by pressure, with the result that after fixing the recording medium 4 is overheated, which slows down the temperature drop of the medium. Along with this, the solidification of the fixed toner 7 is also slowed down. Consequently, when the recorded medium 4, which has been subjected to fixing, is discharged into paper discharge stacker 20 along the shortest distance, the recording medium 4 is folded in the discharge stacker 20 with its toner image in a fused state. This causes a phenomena called toner stick in which the fixed toner 7 sticks onto unspecified regions of the recording medium 4 or other recording medium, which has been subjected to fixing. When toner stick occurs, the required information is transferred onto unspecified regions of the recording medium 4, so that after recording unnecessary misprinted information may occur in the output image, or image loss where necessary information is missing may occur. To overcome this problem, in the embodiment, a circuitous guiding member 19 is provided, whereby after passing the recording medium guiding member 10, the distance of transportation of the recording medium 4 to the discharge stacker 20 is increased, thus giving the recording medium 4 time to cool. In general, although the paper can be cooled down about 50° C. every second by natural cooling in air, once it is accumulated in the discharge stacker, thermal insulation of the paper itself drastically slows down the cooling speed to about 10° C. every second. Accordingly, increasing the time for cooling in air by means of the circuitous guiding member 19 allows sufficient cooling of the recording medium 4. When the temperature of the recording medium 4 in the discharge stacker is less than 60° C., toner stick can be avoided. In the embodiment, the recording medium 4 has a temperature of 90° C. after it has passed the recording medium guiding member 10 and discharged into the discharge stacker 20 along the shortest distance. The circuitous guiding member 19 allows the cooling time of the recording medium 4 to be increased by 0.7 seconds even when it is discharged along the shortest distance. This reduces the temperature of the recording medium 4 to 55° C. in the discharge stacker 20, thereby preventing toner stick from occurring.

Figure 6:
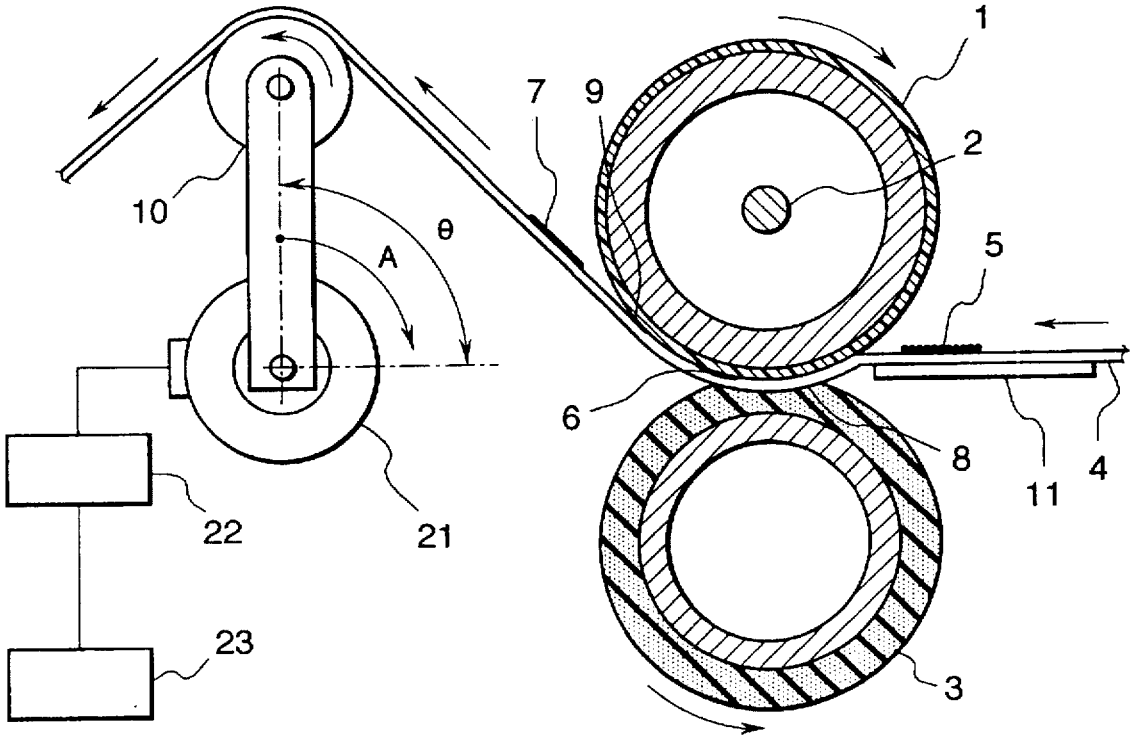
FIG. 6 is a longitudinal sectional view of another embodiment of the present invention.

Another embodiment of the prevent invention will be described with reference to FIG. 6. FIG. 6 is a cross sectional side view of the fixing device provided with a control means of the embodiment. The Figure shows an angle adjustment device 21, a control circuit 22, and a detector 23 for detecting the recording medium thickness. Other members and reference numerals used are the same as those in the embodiment illustrated in FIG. 1. In addition, the operation and the function are the same. The embodiment is constructed as having a control means for changing the length of the contact area 9 where the recording medium contacts the heat roller in accordance with the recording medium 4 thickness. The angle adjustment device 21 is formed by a servomotor, which turns clockwise or counterclockwise based on the signal of the control circuit 22. The rotating shaft of the angle adjustment device 21 is directly connected to the rotating shaft which changes the set angle θ of the recording medium guiding member 10. The set angle θ of the recording medium guiding member 10 is set by the operation of the angle adjustment device 21. On the other hand, the recording medium thickness detecting device 23 detects the thickness of the recording medium and outputs this information in the form of an electrical signal to the control circuit 22. Based on the resultant signal, the control circuit 22 outputs an electrical signal to the angle adjustment device 21 so that it sets the predetermined angle θ in accordance with the thickness of the recording medium 4. The angle θ is set in accordance with the thickness of the recording medium 4, so that the length of the contact area 9 is set in accordance with this thickness. In the embodiment, the paper thickness detecting device 23 is of the light transmitting detecting type. It is placed at the exit portion of the recording medium 4 held by a paper feed hopper (not illustrated) provided in a recording apparatus including the fixing device of the invention built therein. Instead of using the recording medium thickness detecting device 23, an operator of the recording apparatus may input the recording medium thickness by means of an operator panel. According to the embodiment, the thickness of the recording medium is automatically detected and the length of the contact area is set based on the detected thickness, so that the right fixing strength can be always provided.

The present invention provides a fixing device capable of preventing image slippage from occurring and increasing the fixing strength, without the use of a preheater. This is made possible by a contact region where the recording medium comes into contact with the heat roller after it has passed through the nipping and fusing section, whereby the unfixed toner is formed into a semi-fixed toner, whose length is changed according to the recording medium thickness.

In addition, the fixing device of the present invention is capable of preventing fixing failure at the central portion of the heat roller by increasing the thermal conductivity of the core metal of the heat roller and by controlling temperature drop at the central portion of the heat roller when printing is carried out successively for a long period of time.

Further, the fixing device of the present invention is capable of preventing fixing failure at the central, portion of the heat roller because the temperature of the heat roller is controlled when a large amount of heat is provided to its central portion which consumes a large amount of heat, and temperature drop of the central portion of the heat roller is controlled when printing is performed successively for a long period of time.

Still further, the fixing device of the present invention is capable of preventing misprinting and image loss caused by toner stick by purposely increasing the time required for the recording medium, after being subjected to fixing, to reach the stacker, which results in sufficient cooling of the recording medium.

What is claimed is:

1. A fixing device in which a recording medium to be transported is nipped to fix a toner image formed thereon, said fixing device comprising:

a pair of rotatable fixing rollers which face each other, with at least one of the rollers internally provided with a heating element, said pair of fixing rollers press-contacting the recording medium to form a nipping and fusing section for the toner image; and recording medium guiding means which is provided at the downstream side following the nipping and fusing section formed by the fixing rollers and which change the length of contact area of the recording medium to the outer periphery of the fixing roller, internally having built therein a heating element, in accordance with the recording medium thickness.

2. A fixing device according to claim 1, wherein the fixing roller with heating element is an aluminum hollow cylinder, which is called a core metal, whose outer periphery is coated with a parting layer of fluorocarbon resin material.

3. A fixing device according to claim 2, wherein the fixing roller with heating element has at least one heat pipe as heating element embedded in the interior of the cylindrical core metal in the longitudinal dimension.

4. A fixing device according to claim 3, wherein said recording medium guiding means has a control means for setting the rotating angle of its supporting arm to a predetermined value in accordance with the recording medium thickness.

5. A fixing device according to claim 3, wherein a circuitous guiding member for allowing cooling of the recorded medium is provided along with said recording medium guiding means at the downstream side in the transporting direction of the recording medium between said recording medium guiding means and a stacker into which is discharged recorded medium.

6. A fixing device according to claim 3 which is used as at least one component of a recording apparatus.

7. A fixing device according to claim 2, wherein the fixing roller with heating element is internally provided with a plurality of heating elements each having a different heating value distribution, in which detectors are provided so as to face the roller for detecting the surface temperature of the roller at positions corresponding to those section of the heating elements where the heat value of each heating element is maximum, so as to control the operation of the heating elements and thereby to maintain the roller surface temperature at a predetermined value.

8. A fixing device according to claim 7, wherein said recording medium guiding means has a control means for setting the rotating angle of its supporting arm to a predetermined angle in accordance with the recording medium thickness.

9. A fixing device according to claim 7, wherein a circuitous guiding member for allowing cooling of the recorded medium is provided along with said recording medium guiding means at the downstream side in the transporting direction of the recording medium between said recording medium guiding means and a stacker into which is discharged the recorded medium.

10. A fixing device according to claim 7 which is used as at least one component of a recording apparatus.

11. A fixing device according to claim 1, wherein the fixing roller with heating element has a halogen lamp as heating element in the hollow of the cylindrical core metal.

12. A fixing device according to claim 1, wherein said recording medium guiding means has a recording medium guide roller and a rotatable supporting arm, in which the rotating angle of its supporting arm can be set to a predetermined value in accordance with the recording medium thickness.

13. A fixing device according to claim 12, wherein said recording medium guiding means has a control means for setting the rotating angle of its supporting arm to a predetermined value in accordance with the recording medium thickness.

14. A fixing device according to claim 1, wherein a circuitous guiding member for allowing cooling of the recorded medium is provided along with said recording medium guiding means at the downstream side in the transporting direction of the recording medium between said recording medium guiding means and a stacker into which is discharged recorded medium.

15. A fixing device according to claim 1, which is used as at least one component of a recording apparatus.

16. A fixing device according to claim 1, wherein the fixing roller with heating element is a copper hollow cylinder or core metal, whose outer periphery is coated with a parting layer made of fluorocarbon resin material.

17. A fixing device according to claim 16, wherein the fixing roller with heating element has nickel plated along the outer surface of the copper hollow cylinder or core metal.

18. A fixing device according to claim 16, wherein said recording medium guiding means has a control means for setting the rotating angle of its supporting arm to a predetermined value in accordance with the recording medium thickness.

19. A fixing device according to claim 16, wherein a circuitous guiding member for allowing cooling of the recorded medium is provided along with said recording medium guiding means at the downstream side in the transporting direction of the recording medium between the recording medium guiding means and a stacker into which is discharged recorded medium.

20. A fixing device according to claim 16 which is used at least as one component of a recording apparatus.

21. A fixing method in which a recording medium to be transported is nipped to fix a toner image thereon, said method comprising the steps of:

fusing the toner by press-contacting the recording medium between a pair of rotatable fixing rollers facing each other with at least one of its rollers provided with a heating element at its interior; and changing the length of a contact area of the recording medium to the outer periphery of the fixing roller with heating element in accordance with the recording medium thickness by means of a recording medium guiding means provided at the downstream side following the nipping and fusing section formed by the fixing rollers.

22. A fixing method according to claim 21, wherein in the step of changing the length of the contact area of the recording medium to the outer periphery of the fixing roller with heating element, the rotating angle of a supporting arm of the recording medium guiding means, having a recording medium guiding roller and the rotatable supporting arm, is set in accordance with the recording medium thickness.

23. A fixing method according to claim 21 further comprising the step of allowing cooling of the recorded medium by providing a circuitous guiding member between the recording medium guiding means and a stacker into which is discharged the recorded medium.

24. A fixing method according to claim 21, wherein in the step of press-contacting the recording medium between a pair of fixing rollers which face each other, there is used a fixing roller, internally provided with a plurality of heating elements each having a different heating value distribution along the longitudinal dimension of the roller, and wherein temperature detectors are provided so as to face the roller at positions corresponding to those sections of the heating elements where the heat value is maximum to detect the surface temperature of the roller and thereby to control the operation of the heating elements, whereby the roller surface temperature is maintained at a predetermined value.

25. A fixing device in which a recording medium to be transported is nipped to fix a toner image formed thereon, said fixing device comprising:

a pair of fixing rollers, having a rotatable heat roller and a back-up roller which face each other, which form a nipping and fusing section where the recording medium is press-contacted for toner fixing, said heat roller being an aluminum hollow cylinder or core metal whose outer periphery is coated with a parting layer of fluorocarbon resin material and has at least one halogen lamp as heating element in its interior, with temperature sensors for detecting the surface temperature of the roller provided in a plurality of places including at least the roller end portion to control the operation of the halogen lamp so that it maintains the roller surface temperature at a predetermined value;

a recording medium guiding member for changing the length of contact area of the recording medium to the outer periphery of the heat roller in accordance with the recording medium thickness, which is provided at the downstream side following the nipping and fusing section formed by the pair of fixing rollers, said recording medium guiding member made up of a recording medium guiding roller and a rotatable supporting arm in which the rotating angle of its supporting arm can be set to a predetermined value in accordance with the recording medium thickness; and a circuitous guiding member which is provided at the downstream side from the recording medium; guiding member between this guiding member and a recording medium stacker.

*26. A fixing device in which a recording medium to be transported is nipped to fix a toner image formed thereon, said fixing device comprising a pair of rotatable fixing rollers which face each other, with at least one of the fixing rollers being internally provided with heating elements, said pair of fixing rollers press-contacting the recording medium to form a nipping and fusing section for the toner image, wherein the at least one fixing roller with heating elements is internally provided with a plurality of heating elements each having a different heating value distribution, at least one detector is provided so as to face the at least one fixing roller for detecting the surface temperature of the at least one fixing roller at positions corresponding to at a section of at least one heating element where the heat value of each heating element is maximum, so as to control the operation of the heating elements and thereby to maintain the surface temperature of the at least one fixing roller at a predetermined value, and further comprising recording medium guiding means provided at the downstream side following the nipping and fusing section formed by the fixing rollers and for changing the length of contact area of the recording medium to the outer periphery of the at least one fixing roller in accordance with a recording medium thickness.*

*27. A fixing device in which a recording medium to be transported is nipped to fix a toner image formed thereon, said fixing device comprising a pair of rotatable fixing rollers which face each other, with at least one of the fixing rollers being internally provided with heating elements, said pair of fixing rollers press-contacting the recording medium to form a nipping and fusing section for the toner image, wherein the at least one fixing roller with heating elements is internally provided with a plurality of heating elements each having a different heating value distribution, at least one detector is provided so as to face the at least one fixing roller for detecting the surface temperature of the at least one fixing roller at positions corresponding to at a section of at least one heating element where the heat value of each heating element is maximum, so as to control the operation of the heating elements and thereby to maintain the surface temperature of the at least one fixing roller at a predetermined value, wherein a plurality of detectors are provided so as to face the at least one fixing roller for detecting the surface temperature of the at least one fixing roller at positions corresponding to the sections of the heating elements where the heat value of each heating element is maximum, so as to control the operation of the heating elements and thereby to maintain the roller surface temperature at the predetermined value, further comprising recording medium guiding means provided at the downstream side following the nipping and fusing section formed by the fixing rollers and for changing the length of contact area of the recording medium to the outer periphery of the at least one fixing roller in accordance with a recording medium thickness.*

* * * * *